United States Patent
Andersson et al.

(10) Patent No.: US 12,335,494 B2
(45) Date of Patent: Jun. 17, 2025

(54) SMOOTH SURFACE PREDICTION

(71) Applicant: Telefonaktiebolaget LM Ericsson (publ), Stockholm (SE)

(72) Inventors: Kenneth Andersson, Gävle (SE); Jack Enhorn, Bålsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 80 days.

(21) Appl. No.: 18/284,444

(22) PCT Filed: Mar. 30, 2022

(86) PCT No.: PCT/SE2022/050315
§ 371 (c)(1),
(2) Date: Sep. 27, 2023

(87) PCT Pub. No.: WO2022/211715
PCT Pub. Date: Oct. 6, 2022

(65) Prior Publication Data
US 2024/0171757 A1   May 23, 2024

Related U.S. Application Data

(60) Provisional application No. 63/168,613, filed on Mar. 31, 2021.

(51) Int. Cl.
*H04N 7/12*   (2006.01)
*H04N 19/124*   (2014.01)
(Continued)

(52) U.S. Cl.
CPC ......... *H04N 19/176* (2014.11); *H04N 19/124* (2014.11); *H04N 19/154* (2014.11); *H04N 19/159* (2014.11); *H04N 19/198* (2014.11)

(58) Field of Classification Search
CPC ................................................... H04N 19/124
See application file for complete search history.

(56) References Cited

U.S. PATENT DOCUMENTS

| | | |
|---|---|---|
| 10,897,625 B2 | 1/2021 | Kwon et al. |
| 2007/0248164 A1 | 10/2007 | Zuo et al. |

(Continued)

FOREIGN PATENT DOCUMENTS

| | | |
|---|---|---|
| EP | 2624558 A2 | 8/2013 |
| EP | 2993903 A1 | 3/2016 |

(Continued)

OTHER PUBLICATIONS

International Search Report and Written Opinion with Transmittal dated Apr. 27, 2022 issued in International Patent Application No. PCT/SE2022/050315 (19 pages).

(Continued)

*Primary Examiner* — Y Lee
(74) *Attorney, Agent, or Firm* — Rothwell, Figg, Ernst & Manbeck, P.C.

(57) ABSTRACT

A method for making a smooth prediction block of samples in a picture in an image or video encoder or decoder is provided. The method includes determining parameters r of a polynomial model by $r=(B^T B)^{-1}*(B^T*x)$, where B is a matrix of bases and x is a source of samples in vector form. The method includes predicting a block x' based on the parameters r and the matrix of bases B.

11 Claims, 9 Drawing Sheets

(51) Int. Cl.
*H04N 19/154* (2014.01)
*H04N 19/159* (2014.01)
*H04N 19/176* (2014.01)
*H04N 19/196* (2014.01)

(56) References Cited

U.S. PATENT DOCUMENTS

2018/0288413 A1  10/2018  Filippov et al.
2019/0045192 A1  2/2019   Socek et al.

FOREIGN PATENT DOCUMENTS

| JP | 2009-533900 A | 9/2009 |
| WO | 2007/117707 A1 | 10/2007 |
| WO | 2018/209067 A1 | 11/2018 |
| WO | 2020/041003 A1 | 2/2020 |
| WO | 2020/125803 A1 | 6/2020 |
| WO | 2020/130889 A1 | 6/2020 |
| WO | 2022/037583 A1 | 2/2022 |

OTHER PUBLICATIONS

Chen, J., et. al., "The Joint Exploration Model (JEM) for Video Compression With Capability Beyond HEVC", IEEE Transactions on Circuits and Systems for Video Technology, vol. 30, No. 5, May 2020 (18 pages).

Hu, W., et. al., "Multiresolution Graph Fourier Transform for Compression of Piecewise Smooth Images", IEEE Transactions on Image Processing, vol. 24, No. 1, Jan. 2015 (15 pages).

Andersson, K., et. al., "AHG 10: QP control for very smooth blocks", Document: JVET-V0078-v2, Joint Video Experts Team (JVET) of ITU-T SG 16 WP 3 and ISO/IEC JTC 1/SC 29, 22nd Meeting, by teleconference, Apr. 20-28, 2021 (7 pages).

Andersson, K., et. al., "AHG 10: Alignment of smooth QP control with adaptive QP in VTM", Document: JVET-W0043 v2, Joint Video Experts Team (JVET) of ITU-T SG 16 WP 3 and ISO/IEC JTC 1/SC 29, 23rd Meeting, by teleconference, Jul. 7-16, 2021 (4 pages).

"Series H: Audiovisual and Multimedia Systems; Infrastructure of audiovisual services—Coding of moving video; Versatile video coding", ITU-T Telecommunications Standardization Sector of ITU, Aug. 2020, pp. 1-516, No. H.266 (516 pages).

Zhao, X.O. et al., "Lossless Image Compression Using Super-Spatial Structure Prediction", IEEE Signal Processing Letters, vol. 17, No. 4, Apr. 2010 (4 pages).

Wu, X. et al., "Context-Based, Adaptive, Lossless Image Coding", IEEE Transactions on Communications, vol. 45, No. 4, Apr. 1997 (8 pages).

Fernández, D.G. et al., "Complexity reduction in the HEVC/H265 standard based on smooth region classification", Digital Signal Processing, Academic Press, vol. 73, Nov. 7, 2018 (16 pages).

SMOOTH SURFACE PREDICTION

CROSS REFERENCE TO RELATED APPLICATIONS

This application is a 35 U.S.C. § 371 National Stage of International Patent Application No. PCT/SE2022/050315, filed 2022 Mar. 30, which claims priority to U.S. Provisional Patent Application No. 63/168,613, filed 2021 Mar. 31, which is incorporated by this reference.

TECHNICAL FIELD

This disclosure relates to coding and decoding of video sequences and/or still images, and more particularly, to smooth surface prediction.

BACKGROUND

A video sequence includes one or more images (also referred to herein as "pictures"). When viewed on a screen, the image has pixels, each pixel typically having a red, green and blue (RGB) value. However, when encoding and decoding a video sequence, the image is often not represented using RGB but typically using another color space, including but not limited to YCbCr, ICTCP, non-constant-luminance YCbCr, and constant luminance YCbCr. If one takes the example of non-constant luminance YCbCr, which is currently the most used representation, it is made up of three components, Y, Cb and Cr. It is often the case that Y, which is called luma and which roughly represents luminance, is of full resolution, whereas the two other components, Cb and Cr, called chroma, are of a smaller resolution. A typical example is a high definition (HD) video sequence containing 1920×1080 RGB pixels, which is often represented by a 1920×1080-resolution Y component, a 960×540 Cb component and a 960×540 Cr component. The elements in the components are called samples. In the example given above, there are therefore 1920×1080 samples in the Y component, and hence a direct relationship between samples and pixels. Therefore, in this document, the term pixels and samples can be used interchangeably. For the Cb and Cr components, there is no direct relationship between samples and pixels; a single Cb sample typically influences several pixels.

In the Versatile Video Coding standard (VVC) that is developed by the Joint Video Experts Team (JVET) (also referred to herein as the "VVC"), the decoding of an image is carried out in two stages; prediction coding and loop filtering. In the prediction decoding stage, the samples of the components (Y, Cb and Cr) are partitioned into rectangular blocks. As an example, one block may be of size 4×8 samples, whereas another block may be of size 64×64 samples. The decoder obtains instructions for how to obtain a prediction for each block, for instance to copy samples from a previously decoded image (an example of temporal prediction) or copy samples from already decoded parts of the current image (an example of intra prediction), or a combination thereof. To improve this prediction, the decoder may obtain a residual, often encoded using transform coding such as discrete sine or cosine transform (DST or DCT). This residual is added to the prediction, and the decoder can proceed to decode the next block. Transforms are extensively used to remove spatial redundancy from the prediction error from intra picture and inter picture prediction in video coding. The transform sizes have increased with the progression of video coding standards. In H.264 the maximum transform size was 16×16, in HEVC the maximum transform size was 32×32 and in VVC, the latest MPEG/ITU video coding standard, the maximum transform size is 64×64. In VVC also a secondary low frequency non-separable transform (LFNST) can be applied after the separable DCT/DST based transform. In work beyond version 1 of VVC it has been shown that increase of transform size can provide further gains in coding efficiency. Future standards will likely use even larger transform sizes.

The output from the prediction decoding stage is the three components Y, Cb, and Cr. However, it is possible to further improve the fidelity of these components, and this is done in the loop filtering stage. The loop filtering stage in VVC consists of three sub-stages; a deblocking filter stage, a sample adaptive offset (SAO) filter sub-stage, and an adaptive loop filter (ALF) sub-stage. In the deblocking filter sub-stage, the decoder changes Y, Cb, and Cr by smoothing edges near block boundaries when certain conditions are met. This increases perceptual quality (subjective quality) since the human visual system is very good at detecting regular edges such as block artifacts along block boundaries. In the SAO sub-stage, the decoder adds or subtracts a signaled value to samples that meet certain conditions, such as being in a certain value range (band offset SAO) or having a specific neighborhood (edge offset SAO). This can reduce ringing noise since such noise often aggregate in a certain value range or in specific neighborhoods (e.g., in local maxima). The reconstructed image component that are the result of this stage are denoted YSAO, CbSAO, CrSAO.

A well performing video coding standard includes an efficient intra prediction to enable a small amount of prediction error at a small bit cost. To that end, intra prediction in HEVC and VVC has many modes that can extrapolate the texture from neighboring previously coded samples. Those can give a good prediction of DC, planar surface, and lines for the current block to be coded.

To adapt video coding for good subjective video quality adaptive quantization parameter (QP) of the transform coefficients are deployed. One exemplarily adaptive QP method is to derive variance of a block and give a low QP to blocks with low variance and a higher QP to blocks with high variance. This enables better accuracy of smooth blocks than of blocks with lots of details. This makes more efficient use of bits where they matter most.

Haralic introduced a facet model for image data in a paper form 1981 which he used for image restoration. A polynomial model or a facet model is a parametric representation of samples using polynomials. A first order model can be described by $f(x,y)=r0+r1*x+r2*y$, where r0 to r2 are coefficients that control how much a sample according to the model depends on constant (r0), horizontal slope x (r1) and vertical slope y (r2). Polynomials has also been used for interpolation in image and video coding.

SUMMARY

Transforms in current video coding standards are excellent in compressing prediction error, but when faced with simple signals they tend to add unnecessary overhead such as when faced with smooth source samples beyond DC or when faced with a low quality setting producing a too coarse representation of transform coefficients to enable an accurate representation of smooth source samples. Intra prediction, in current standards, bases prediction on samples outside the current block which make the prediction sensitive to coding artifacts from coding of previous coding blocks. Adaptive quantization parameter (QP) methods typically favor blocks with source samples close to a constant value (DC) rather than favoring smooth blocks in general.

Embodiments can be used in an encoder to improve current and future standards. For example, embodiments can be used to detect blocks that have a smooth surface and use a high-quality setting for those blocks (with a sufficiently low quantization parameter (QP) for quantization of transform coefficients). Embodiments can also be used to introduce intra prediction based on a low frequency model of the source samples, such as a low polynomial model, to enable accurate prediction of smooth source samples, e.g. a smooth surface. Embodiments can also be used as part of deblocking of large blocks, where a low polynomial model is fitted to reconstructed samples. Embodiments can also be used for encoding with adaptive QP in general where a greater QP is given to blocks with higher variation from the smooth surface and a smaller QP is given to blocks with smaller variation from the smooth surface.

Embodiments can greatly improve the visual quality of HDR video, especially for sky regions and when the quality setting becomes more challenging. This corresponds to QP above around 27 for VVC and HEVC.

According to a first aspect, a method for making a smooth prediction block of samples in a picture in an image or video encoder or decoder is provided. The method includes determining parameters r of a polynomial model by $r=(B^T B)^{-1} * (B^T * x)$, where B is a matrix of bases and x is a source of samples in vector form. The method includes predicting a block x' based on the parameters r and the matrix of bases B.

In some embodiments, the smooth prediction block x' comprises $x'=\Sigma_i [r(i)*b(i)]$, where r(i) refers to the i-th component of r and b(i) refers to the i-th basis vector of B, and the sum is taken over the number of basis vectors in B. In some embodiments, the smooth prediction block x' comprises $x'=(\Sigma_i [r(i)*b(i)]+2^{N-1})>>N$, where N is a scaling factor, r(i) refers to the i-th component of r and b(i) refers to the i-th basis vector of B, and the sum is taken over the number of basis vectors in B. In some embodiments, each basis vector b(i) in B has its mean removed such that b(i):=b(i)−mean (b(i)). In some embodiments, B at least includes three bases B={b1, b2, b3}, where b1={1, 1, 1, . . . , 1}$^T$, b2={0, 1, . . . M−1, . . . , 0, 1, . . . , M}$^T$, and b3={0, . . . , 0, 1, . . . , 1, M−1, . . . , M−1}$^T$, where M is equal to a height of the block. In some embodiments, B further includes bases (b4, b5, b6) so that B={b1, b2, b3, b4, b5, b6}, where b4={0, . . . , 0, 1, 2, . . . M−1, . . . , M−1, 2*M−1, . . . , (M−1)*(M−1)}, b5={0, 1, 4, . . . , (M−1)*(M−1), 0, 1, 4, . . . , (M−1)*(M−1)} and b6={0, . . . , 0, 1, . . . , 1, 4, . . . , 4, . . . , (M−1)*(M−1)}.

In some embodiments, $(B^T B)^{-1}$ is precomputed. In some embodiments, the source of samples x is determined by taking a subset of samples (e.g., every second sample horizontally and vertically). In some embodiments, each basis vector b(i) in B is taken at sample positions which are multiples of two. In some embodiments, a height of the block (M) is equal to the maximum transform size used in the image or video encoder/decoder.

According to a second aspect, a method for adjusting a quantized parameter is provided. The method includes determining that a block in an image is smooth. The method includes determining that the quantized parameter (QP) would reduce the quality of the block after compression. The method includes, as a result of determining that the block in the image is smooth and determining that the QP would reduce the quality of the block after compression, decreasing the QP for the block so that it is encoded with higher quality.

In some embodiments, determining that a block in an image is smooth comprises: determining parameters for a model based on low-frequency base functions; predicting predicted samples with the determined parameters; comparing the predicted samples with source samples of the block to determine an error; and determining that the error is below a threshold. In some embodiments, the low-frequency base functions comprise polynomial functions, and wherein comparing the predicted block with source samples to determine an error comprises computing one or more of a sum-of-absolute-differences (SAD) value and a sum-of-squared-differences (SSD) value for the differences between the source samples of the block and the predicted samples. In some embodiments, decreasing the QP for the block so that it is encoded with higher quality comprises determining the decrease of the QP based on a linear model such that the decrease is larger for higher QPs and that there is no decrease of the QP below a specified value.

In some embodiments, the decrease of the QP is determined by min(0,QPscale*QP+QPoffset), where QPscale and QPoffset are parameters. In some embodiments, the decrease of QP is limited by a limiting value. In some embodiments, the decrease of the QP is determined by max(QPlimit, min(0,QPscale*QP+QPoffset)), where QPscale, QPoffset and QPlimit are parameters. In some embodiments, the method further includes determining that the image is an intra-coded picture type, and wherein decreasing the quantized parameter (QP) for the block so that it is encoded with higher quality is performed as a result of determining that the image is an intra-coded picture type. In some embodiments, the method further includes determining that the image has a sequence number (e.g. picture order count (POC)) within a sequence of images that is a multiple of a value M, and wherein decreasing the quantized parameter (QP) for the block so that it is encoded with higher quality is performed as a result of determining that the image has a sequence number that is a multiple of M. In some embodiments, M is one of 2, 4, 8, 16, and 32. In some embodiments, determining that a block in an image is smooth is based on information at a sub-block level of granularity.

According to a third aspect, a computer program is provided, comprising instructions which when executed by processing circuitry of a node, causes the node to perform the method of any one of the embodiments of the first and second aspects.

According to a fourth aspect, a carrier containing the computer program of the third aspect is provided. The carrier is one of an electronic signal, an optical signal, a radio signal, and a computer readable storage medium.

According to a fifth aspect, an encoder is provided. The encoder includes processing circuitry. The encoder includes a memory, the memory containing instructions executable by the processing circuitry. When the instruction are executed, the encoder is configured to perform the method of any one the embodiments of the first and second aspects.

According to a sixth aspect, a decoder is provided. The decoder includes processing circuitry. The decoder includes a memory, the memory containing instructions executable by the processing circuitry. When the instructions are executed, the decoder is configured to perform the method of any one the embodiments of the first aspect.

According to a seventh aspect, an encoder configured to make a smooth prediction block of samples in a picture is provided. The encoder is configured to determine parameters r of a polynomial model by $r=(B^T B)^{-1} * (B^T * x)$, where B is a matrix of bases and x is a source of samples in vector form. The encoder is configured to predict a block x' based on the parameters r and the matrix of bases B.

According to an eight aspect, an encoder configured to adjust a quantized parameter is provided. The encoder is configured to determine that a block in an image is smooth. The encoder is configured to determine that the quantized parameter (QP) would reduce the quality of the block after compression. The encoder is configured to, as a result of determining that the block in the image is smooth and determining that the QP would reduce the quality of the block after compression, decrease the QP for the block so that it is encoded with higher quality.

According to a ninth aspect, a decoder configured to make a smooth prediction block of samples in a picture is provided. The decoder is configured to determine parameters r of a polynomial model by $r=(B^TB)^{-1}*(B^T*x)$, where B is a matrix of bases and x is a source of samples in vector form. The decoder is configured to predict a block x' based on the parameters r and the matrix of bases B.

BRIEF DESCRIPTION OF THE DRAWINGS

The accompanying drawings, which are incorporated herein and form part of the specification, illustrate various embodiments.

DETAILED DESCRIPTION

One aspect of some embodiments is to provide an adaptation of the quantization parameter (QP) for blocks that are determined to be very simple to encode. The adaptation can be performed according to a linear model base on picture QP such that the block QP is reduced more for greater picture QPs than for smaller picture QPs. Another aspect of some embodiments is to determine a low order polynomial model to enable representation of smooth source samples. The model can be used as part of video encoding to determine if a block is simple to encode or as an alternative intra prediction method. Another aspect of some embodiments is to determine a low order polynomial model to enable a smooth representation of reconstructed samples as part of loop filtering (deblocking) in image or video coding.

Figure 1:
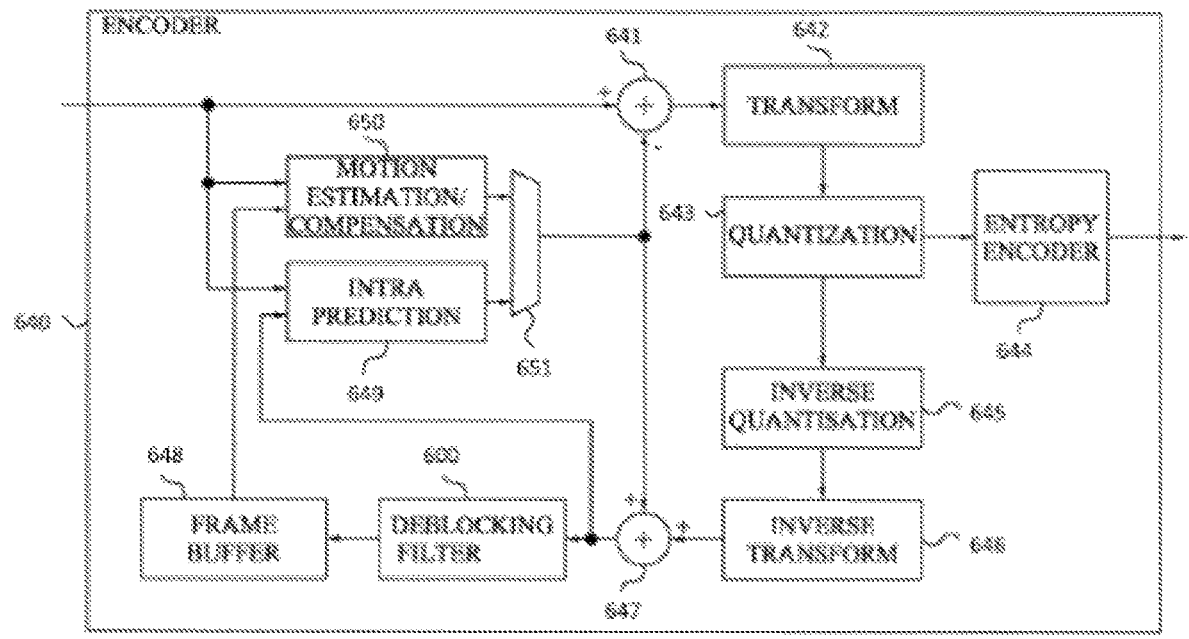
FIG. 1 is an example architecture of an encoder according to an embodiment.
Figure 2:
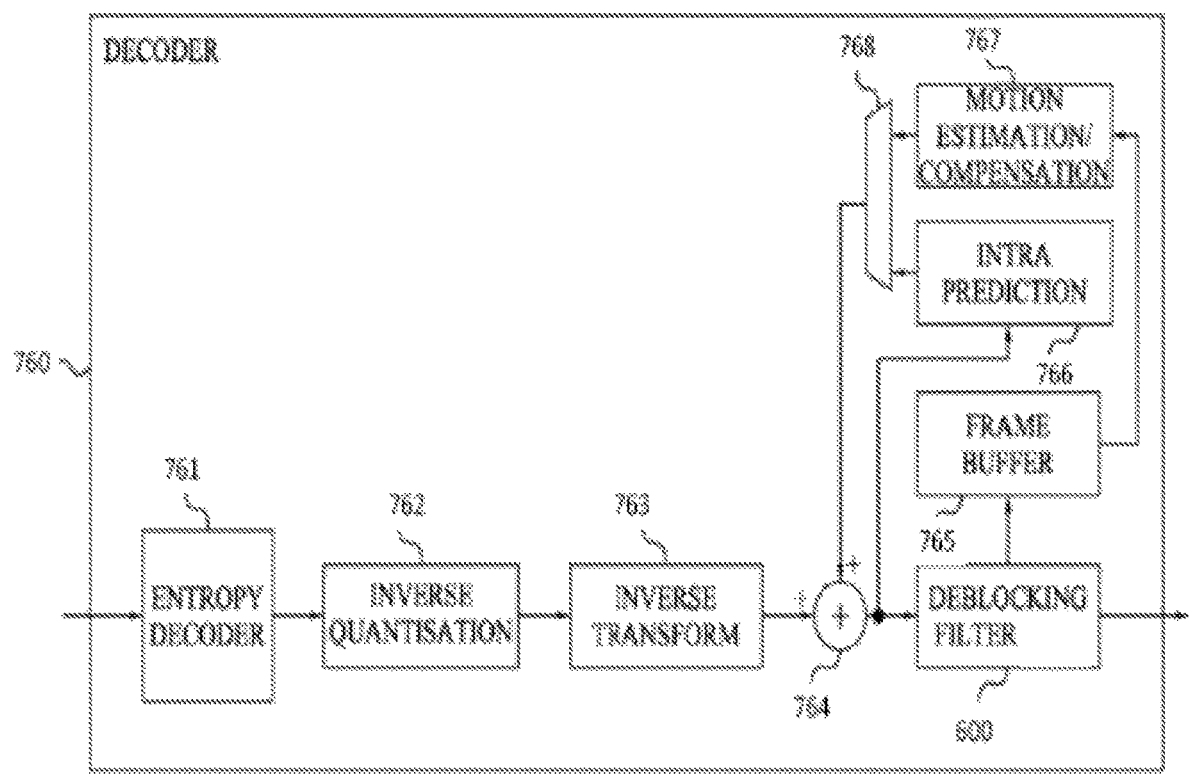
FIG. 2 is an example architecture of a decoder according to an embodiment.

Embodiments are applicable to image and video coding. Embodiments may be incorporated into an encoder (or part of an encoder) only, and may use current or future codec standards. Embodiments may also be incorporated into both an encoder and a decoder (or parts thereof), and may use upcoming codec standards. An exemplary encoder is shown in FIG. 1, and an exemplary decoder is shown in FIG. 2. Other in-loop tools may be performed before or after the deblocking, but other in-loop filters are not included in FIG. 1 and FIG. 2.

Embodiment 1

Figure 3A:
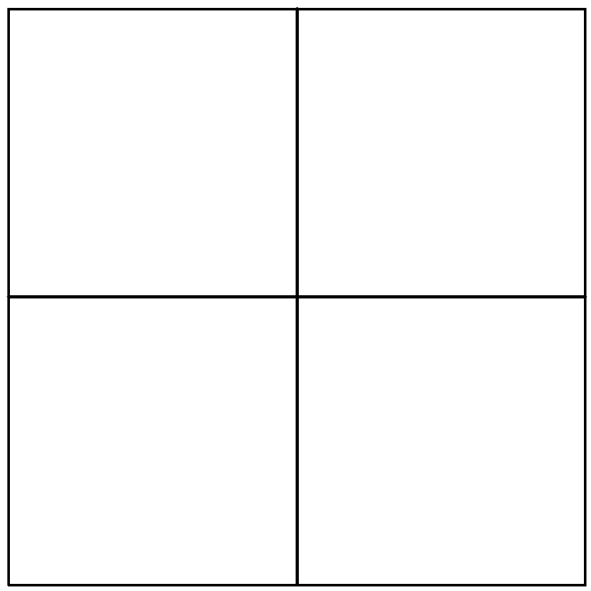
FIGS. 3A and 3B are exemplary diagrams of image blocks.
Figure 3B:
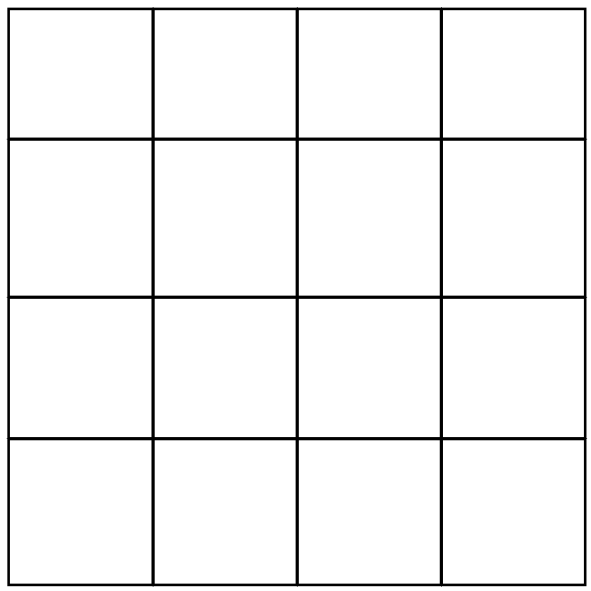

Based on samples of a block, a smooth representation of the block can be obtained by a polynomial model, smooth surface prediction. FIG. 3A and FIG. 3B show examples of blocks, in FIG. 3A an image is partitioned into four blocks and in FIG. 3B an image is partitioned into 16 blocks. Here follows an example of how a polynomial model of order 1 (i.e., having base 1, x, and y) can be derived. Additional basis functions can also be used such as $x^2$, $y^2$ and xy. The base functions are b1 equal to 1 (constant value), b2 equal to x (slope in horizontal direction), and b3 equal to y (slope in vertical direction). For illustrative simplicity the example here uses a block size of 2×2 in vector form, where the first two samples of the vector correspond to the first row of the block and the second two sample corresponds to the second row of the block. We also remove the mean value to reduce the magnitude of the base functions. Accordingly, the bases are given by:

$$b1'=\{1,1,1,1\}^T, b2'=\{1,2,1,2\}^T, b3'=\{1,1,2,2\}^T$$

$$b1=b1', b2=b2'-\text{mean}(b2'), b3=b3'-\text{mean}(b3')$$

The base functions can then be put into a matrix B (with the base functions as the columns), so that B={b1, b2, b3}. The parameters of the model can then be determined as:

$$r=(B^TB)^{-1}*(B^T*x)$$

where x is the source samples of the block in vector form. Then a prediction block x' based on the determined parameters and the base functions can be derived as:

$$x'=r(0)+r(1)*b2+r(2)*b3$$

Since $(B^TB)^{-1}$ is determined by the base functions and not source samples it can be pre-computed. With a pre-computed matrix inverse it is straight forward to determine the model parameters, even in the case where more base functions are used than b1, b2, and b3. In general, more base functions can be used to model higher order polynomials. The mean removal from the base functions (e.g., from b2 and b3 as shown above) can help avoid very small numbers after the inverse of $B^TB$, which can be more efficient especially for larger block sizes. Mean removal for this example of base functions also gives orthogonal base functions, which results in only non-zero elements in the diagonal of $(B^TB)^{-1}$. This is not typically the case for higher orders of polynomials.

The size of $(B^TB)^{-1}$ depends on the number of base functions used. The dimension is nBase×nBase, where nBase is the number of base functions.

Embodiment 2

Different approaches can be used to reduce the complexity of embodiment 1.

One approach to reduce complexity is to reduce the number of samples where the model is determined. Additionally, the number of samples where the model is tested can be reduced. Reduction of number of samples can be performed by having a sparse sampling grid. For example, by determining and testing every second sample horizontally and every second sample vertically, complexity can be reduced 4 times. Other sparse sampling techniques may also be used.

The base functions can also be taken at sample positions which are multiples of 2 to enable use of shifts instead of multiplications. That is, 1 ($2^0$), 2 ($2^1$), 4 ($2^2$), 8 ($2^3$), 16 ($2^4$), and 32 ($2^5$), correspond respectively to (1<<0), (1<<1), (1<<2), (1<<3), (1<<4), (1<<5), and so on, where << denotes a left shift operation.

The complexity can also be reduced by performing the prediction in fixed point arithmetic such as $$x'=(r(0)+r(1)*b2+42)*b3+2^{N-1})>>N$$

where N is a scaling factor.

Embodiment 3 (Intra Prediction)

Figure 4A:
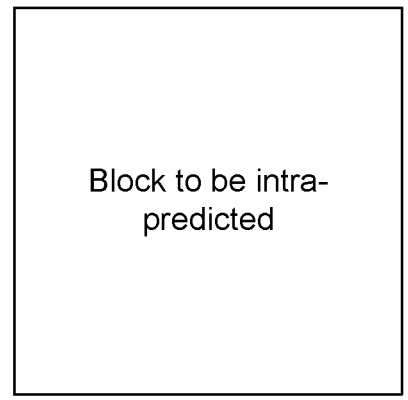
FIGS. 4A and 4B are exemplary diagrams of image blocks.
Figure 4B:
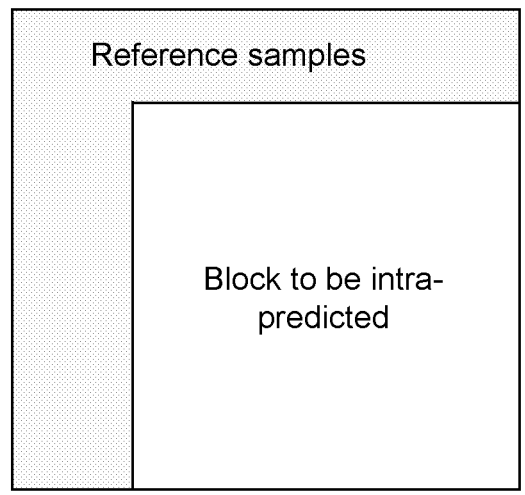

The approach in embodiments 1-2 may be used as a smooth intra prediction mode in video or image coding for prediction of a block. For example, FIG. 4A shows a block to be intra-predicted, and FIG. 4B shows a block to be intra-predicted along with reference samples above a horizontal block boundary and to the left of a vertical block boundary. The input samples for the block can in this case be source samples before coding. To get a better alignment of the prediction of the block and previously reconstructed samples outside the block (e.g., the reference samples shown), the input samples could also include reconstructed samples. These reference samples may include rows of samples above and columns of samples to the left of the block, such as shown in FIG. 4B. One example is to have 4 columns above and 4 rows to the left of the current block, although different reference samples may also be selected.

On the encoder side, the model parameters may be quantized and entropy coded. The encoder may also signal a flag that enables/disables the mode on the decoder side. That is, the flag can inform the decoder about whether the approach in embodiments 1-2 is being used as a smooth intra prediction mode. When an enable flag is received at the decoder side, the decoder may do inverse entropy coding and inverse quantization of the model parameters and then derive a prediction block based on those.

Typical values of interest to maintain as part of quantization are for slope parameters (x and y) below a magnitude of 1. Parameters for 2nd order base functions typically are below a magnitude of 0.1. For 10-bit video, DC parameters can have a range from 0 to 1023, e.g. 10 bits; first order parameters can be represented with 11 bits after multiplication of floating point values with 1024, such that the range is from −1024 to 1024, e.g. 11 bits; and second order parameters (if used) can be represented with 12 bits after multiplication of 2048, such that the range is −2048 to +2048. Higher order parameters can be similarly represented.

To reduce the overhead for compression of the parameters, the parameters of the current block can be predicted based on neighboring samples, e.g. samples immediately above and to the left of the current block (such as the reference samples shown in FIG. 4B).

For example, a prediction of the DC parameter can be derived from the average of samples immediately above and to the left of the current block. A prediction of the parameter for the x or $x^2$ base function can be estimated based on samples immediately above the current block. A prediction of the parameter for the y or $y^2$ base function can be estimated based on samples immediately to the left of the current block. In this case, the parameter for the xy base function is not predicted. If several rows above and several columns to the left are available as reference samples, a prediction of all parameters can be based on samples from those rows and columns.

In some embodiments, the parameters are directly encoded. In some embodiments, only a delta value of the parameters need to be encoded, where the delta is determined based on the prediction of the parameters of the current block. In this case, for example, the DC parameter can be encoded with 10 bits including sign, a range between −512 to 512. The first order parameters can be represented with 10 bits including sign, a range between −512 to 512. The second order parameters can be represented with 10 bits including sign, a range between −512 to 512. The quantized value to be encoded can be determined as follows:

$$rQ[n]=\text{int}(S[n]*(r[n]-r\text{Pred}[n])+0.5),$$

$$rQ[3]=\text{int}(S[3]*r[3])+0.5),$$

where rQ[3] is computed separately in case only one row above or one column to the left is available, and otherwise it may be computed as in the general rQ[n] equation above. In the equations here, 0<=n<nBases (where nBases=6 here), S[n] are scale factors used for quantization, e.g. S[0]=1, S[1]=S[2]=S[4]=S[5]=512, S[3]=2048.

Then after encoding (e.g., entropy encoding) the quantized parameters, the decoder can derive the inversely quantized parameters as:

$$r'[n]=r\text{Pred}[n]+(rQ[n]+S[n]/2)/S[n]$$

or with shift notation, where log 2 can be precomputed, e.g. 1 for S[n]=2, etc., $$r'[n]=r\text{Pred}[n]+(rQ[n]+1<<\log 2(S[n]))>>\log 2(S[n])$$

$$r'[0]=r\text{Pred}[0]+rQ[0]$$

$$r'[3]=(rQ[3]+S[3]/2)/S[3]$$

In this case, r'[0] is computed separately. Also, r'[3] is computed separately in case only one row above or one column to the left is available, and otherwise it may be computed as in the general r'[n] equation above.

Based on the quantized parameters obtained at the decoder, a prediction block can be derived by multiplying the model parameters with respective base function at respective positions inside the block to derive the predicted block:

For x=0 to W,
For y=0 to H, $$X(x,y)=r'[0]+r'[1]*(x-m[1])+r'[2]*(y-m[2])+r'[3]*\\(x*y-m[3])+r'[4]*(x*x-m[4])+r'[5]*(y*y-m[5]);$$

End
End where m[1] is the average value of all x, m[2] is the average of all y, m[3] is the average of all x*y, m[4] is the average of all x*x, and m[5] is the average of all y*y.

In the above determination of the prediction block, floating point calculations are used. In some embodiments, the computations could be made in fixed point as follows assuming a constant scale factor F for all non-DC parameters:

For x=0 to W,
For y=0 to H, $$X(x,y)=r'[0]+(F*r'[1]*(x-m[1])+F*r'[2]*(y-m[2])+\\F*r'[3]*(x*y-m[3])+F*r'[4]*(x*x-m[4])+F*r'[5]\\*(y*y-m[5])+F>>1)>>\log_2(F);$$

End
End

To get an alternative prediction of the model parameters of the block reconstructed, samples from rows above and columns to the left of the block can be used (e.g., as shown in FIG. 4B). One example is to have 4 columns above and 4 rows to the left of the current block.

When an adjacent block has been intra predicted by a polynomial model, the model parameters of the current block can be predicted from the adjacent block. The adjacent block could be a block to the left of or above the current block. The DC parameter for the adjacent model is preferably centered at the current block before it is used for prediction. For example, if the neighboring block is to the left of the current block and has size 64×64 and the current block has size 64×64, then the DC parameter (constant base function) of the neighboring block (rNb[0]) needs to be updated according to its x base(rNb[1]), y base(rNb[2]), xy base (rNb[3]), $x^2$ base (rNb[4]), and $y^2$ base (rNb[5]) function for a 2nd order model:

$$rNb'[0]=rNb[0]+rNb[1]*64+rNb[2]*0+rNb[3]*64*0+rNb[4]*64*64+rNb[5]*0*0.$$

As can be seen, only the base functions in x and x 2 effects a movement horizontally. In some embodiments, one can also omit using updates from higher order coefficients (e.g., $x^2$ and $y^2$).

If the neighboring block is above and aligned in x for the same block sizes the updates of the DC before its used may be given as follows:

$$rNb'[0]=rNb[0]+rNb[1]*0+rNb[2]*64+rNb[3]*0*64+rNb[4]*0*0+rNb[5]*64*64.$$

The non-DC parameters from the neighboring block can be used directly.

An alternative mode of operation is for the encoder to only indicate the use of the model and then for the decoder to derive the model parameters on the decoder side based on neighboring reconstructed samples outside the block. In this case, the model parameters do not need to be signaled.

Embodiment 4 (Encoder Control of QP)

Based on source samples of a block, where source samples preferably are de-noised, embodiments may determine how easy it is to encode the source samples. The easiness may be determined by how well low frequency base functions can predict samples of the block. One example of low frequency base functions are low order polynomials (e.g., first or second order polynomials). How well the predicted samples match with the source samples can be determined by an error metric, for example, a sum of absolute differences (SAD) or sum of squared differences (SSD). If the error according to the error metric is below a pre-defined threshold, the block is regarded as easy to encode. Blocks that are determined as easy to encode are encoded with better quality than other blocks. Better quality can be achieved by using a finer quantization, e.g. a lower QP for those blocks. Preferably, the block size should by around the maximum transform size or the maximum CU size, e.g. meaning 64×64/128×128 in VVC or 32×32/64×64 in HEVC. Other sizes are also possible. In VVC and HEVC the method can preferably be used for QP above 27.

For example, a process may determine if a large block is smooth and, if so, encode the block with high quality. Determining if a large block is smooth may proceed as follows. For samples of a large block (e.g. that have been temporally filtered), parameters of a polynomial model may be determined and an error (e.g., a SAD or SSD value) may be computed based on the difference between samples of the large block and predicted samples based on the polynomial model. If the error is less than a threshold, the large block is determined to be smooth. Encoding the block with high quality may proceed as follows. A delta QP value may be computed based on a reference QP value and parameters of a linear model, and the reference QP may be modified by adding the delta QP value. The modified reference QP may then be used to encode the block. In embodiments, this process may proceed only if a picture is first determined to be an intra-coded picture and/or only for pictures that are multiples of M (e.g., M=2, 4, 8, . . . ) within a sequence of pictures.

The error (SAD or SSD) can be computed as the difference between source and predicted samples:

$$err=\Sigma_i abs(x_i-x_i')[SAD]$$

$$err=\Sigma_i (x_i-x_i')^2[SSD]$$

where the sums are each over the samples in the block.

If the error (err) is less than a threshold, the QP is reduced for the block. In some embodiments, the initial QP must be above a QP threshold (e.g., greater than 27), such that reducing the QP is likely to impact picture quality. The threshold for the error (err) may be defined as the total number of samples in the block multiplied with a factor. One example factor is 3, e.g. an average distortion of 3 per sample (for 10-bit video).

The application of the QP reduction could preferably depend on the QP for the current picture such that the QP is reduced according to a linear model. One example is to use a QP modification determined by min(0, (offset+scale*QP)), where offset and scale are parameters of the linear model, e.g. offset is 27 and scale is −1. In this case, for example, the QP is reduced by 16 when QP is 43. By using a smaller magnitude of the scale parameter less aggressive QP change can be made. By using a higher offset parameter the QP change comes into play for greater QPs.

The application of the QP reduction can also be dependent on the type of picture that is coded. For example, QP reduction may be applied only if it is intra coded picture, or only if it is an inter coded picture, or a combination of this. In some embodiments, QP reduction may be applied only at certain intervals, for example every 2nd, 4th, 8th, 16th, or 32:nd frame, etc.

Embodiment 5 (Deblocking)

Embodiments are also applicable to deblocking. Model parameters for a polynomial model may be determined based on reconstructed samples of a large coding block. A large coding block is typically of a size same as the maximum transform size. Examples of large coding block sizes are 64×64, 128×128 or 256×256. The large coding block typically also is a transform block. The model parameters for the large block may then be applied to derive a predicted block and the predicted block may be compared to the reconstructed samples to generate a distortion or error according to an error metric. An example of a metric is SAD or SSD. If the distortion is below a threshold, the coding block is regarded as smooth and has the risk of introducing a block artifact. The risk increases if adjacent blocks also are large coding blocks. The risk is significantly increased if the large block has non-zero transform coefficients. The risk and the visibility of a block artifact also increase with QP for blocks with larger QP than a QP threshold (e.g., 27 in HEVC/VVC).

If it has been determined that the current and the above and left neighboring blocks are smooth, samples of the block may be modified to perform deblocking. The modification could be based on a polynomial model. In some embodiments, the modification of samples may be performed only on samples of the current block. The modification can also be separated in two passes, similar to state of the art deblocking where vertical boundaries are deblocked before horizontal boundaries. The modification of the samples of the block could also be based on state of the art deblocking such that longer tap deblocking than currently used is introduced. For example, a longer tap filter that can modify up to half the width or height of the block on both sides of the block boundary of large blocks may be used.

The modification could also be separated in two passes similar to state of the art deblocking such that vertical block boundaries is dealt with before horizontal block boundaries. If it has been determined that the current and the above neighboring blocks are smooth, samples on the upper side of the block may be modified based on a polynomial model. The aim of the modification is to align the upper side samples with samples of the above block. Similarly, if it has been determined that the current and the left neighboring blocks are smooth, samples on the left side of the block may be modified based on a polynomial model. The aim of the modification is to align the left side samples with samples of the left block. The modification of samples could also be performed on both sides of the block boundary.

The polynomial model used to modify the samples of the current block is preferably to some extent based on model parameters or samples of neighboring blocks. For samples on the upper side of the block the model parameters are preferably based on model parameters or samples from the above block. For samples on the left side of the block the model parameters are preferably based on model parameters or samples from the left block. If samples are filtered in a single step the model parameters or samples are preferably based on both above and left block. In addition, the model parameters can also be based on the model parameters or samples of the current block.

When model parameters from more than one block are used, the model parameters are combined by a weighted average. The DC parameter of a neighboring block is preferably adjusted to be centered on the current block before being combined. One example weighting is to average but also more weight could be assigned to the neighboring block or the current block.

The predicted samples of the model can either replace the samples of the block as part of the deblocking of the block or be added to samples of the block.

The amount of modification could also be reduced depending on QP. For example, the approach may only be employed for higher QP (e.g., above a QP threshold). The amount of modification can also vary with a distance from the block boundary.

Figure 5:
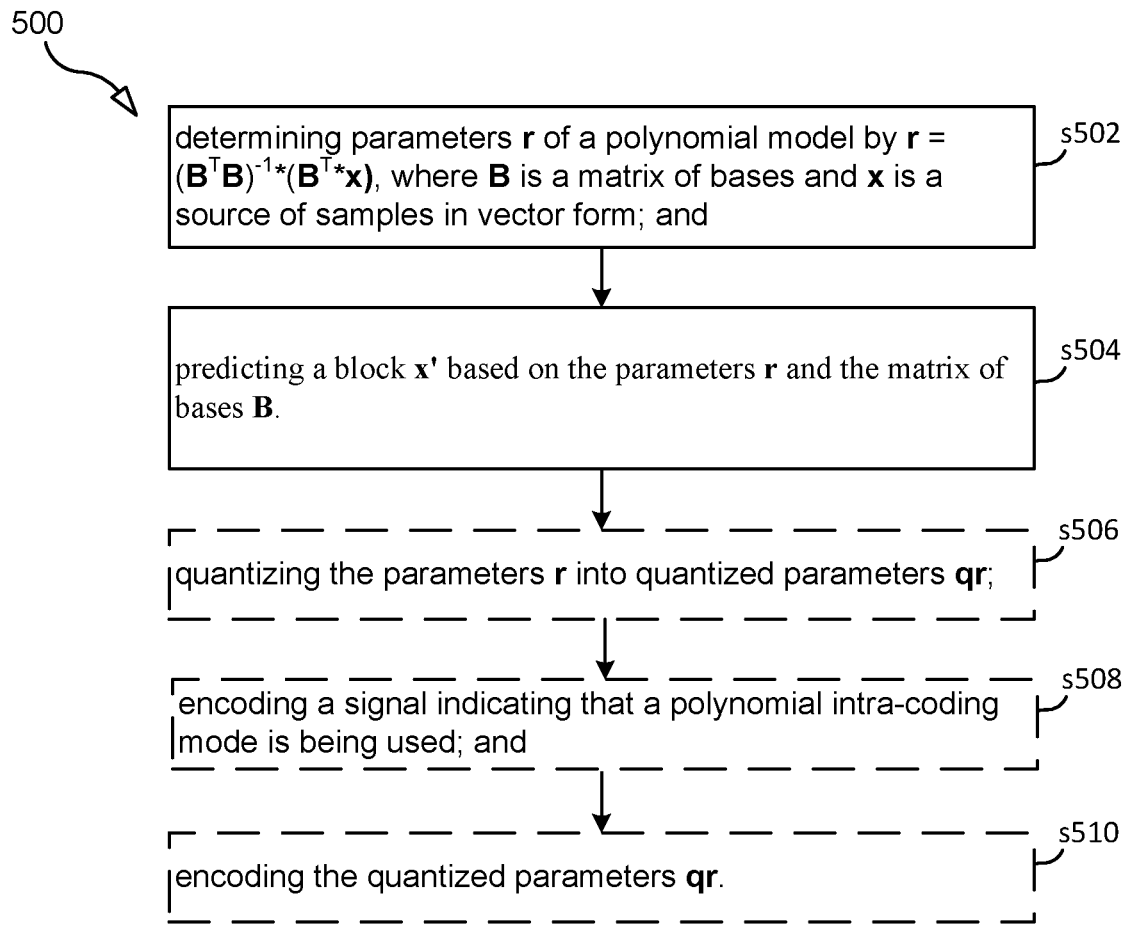
FIG. 5 is a flow chart according to an embodiment.

FIG. 5 illustrates a flow chart according to an embodiment. Process 500 is a method for making a smooth prediction block of samples in a picture in an image or video encoder or decoder. The method may begin with step s502.

Step s502 comprises determining parameters r of a polynomial model by $r=(B^T B)^{-1} * (B^T * x)$, where B is a matrix of bases and x is a source of samples in vector form.

Step s504 comprises predicting a block x' based on the parameters r and the matrix of bases B.

In some embodiments, the smooth prediction block x' comprises $x'=\Sigma_i [r(i) * b(i)]$, where r(i) refers to the i-th component of r and b(i) refers to the i-th basis vector of B, and the sum is taken over the number of basis vectors in B. In some embodiments, the smooth prediction block x' comprises $x'=(\Sigma_i [r(i) * b(i)] + 2^{N-1}) >> N$, where N is a scaling factor, r(i) refers to the i-th component of r and b(i) refers to the i-th basis vector of B, and the sum is taken over the number of basis vectors in B. In some embodiments, each basis vector b(i) in B has its mean removed such that $b(i):=b(i)-\text{mean}(b(i))$. In some embodiments, B at least includes three bases B={b1, b2, b3}, where $b1=\{1, 1, 1, \ldots, 1\}^T$ (constant value), $b2=\{0, 1, \ldots M-1, \ldots, 0, 1, \ldots, M\}^T$ (slope in x), and $b3=\{0, \ldots, 0, 1, \ldots, 1, M-1, \ldots, M-1\}^T$ (slope in y), where M is equal to a height of the block. In some embodiments, B further includes bases (b4, b5, b6) so that B={b1, b2, b3, b4, b5, b6}, where $b4=\{0, \ldots, 0, 1, 2, \ldots M-1, \ldots, M-1, 2*M-1, \ldots, (M-1)*(M-1)\}$ (x*y), $b5=\{0, 1, 4, \ldots, (M-1)*(M-1), 0, 1, 4, \ldots, (M-1)*(M-1)\}$ (x*x) and $b6=\{0, \ldots, 0, 1, \ldots, 1, 4, \ldots, 4, \ldots, (M-1)*(M-1)\}$ (x*y). In some embodiments, $(B^T B)^{-1}$ is precomputed.

In some embodiments, the source of samples x is determined by taking a subset of samples (e.g., every second sample horizontally and vertically). In some embodiments, each basis vector b(i) in B is taken at sample positions which are multiples of two. In some embodiments, a height of the block (M) is equal to the maximum transform size used in the image or video encoder/decoder.

Process 500 may also be used in a method for encoding an image. In this case, the method may further include steps s506, s508, and s510. Samples in an image are predicted according to any of the previous embodiments.

Step s506 comprises quantizing the parameters r into quantized parameters qr.

Step s508 comprises encoding a signal indicating that a polynomial intra-coding mode is being used.

Step s510 comprises encoding the quantized parameters qr.

In some embodiments, the source of samples x comprise samples immediately above and/or to the left of the block x'. In some embodiments, encoding the quantized parameters qr comprises: predicting parameters rPred based on samples immediately above and/or to the left of the block x'; determining a delta value for each component i of qr based on a difference between the quantized parameters qr(i) and the predicted parameters rPred(i); and encoding the delta value.

Figure 6:
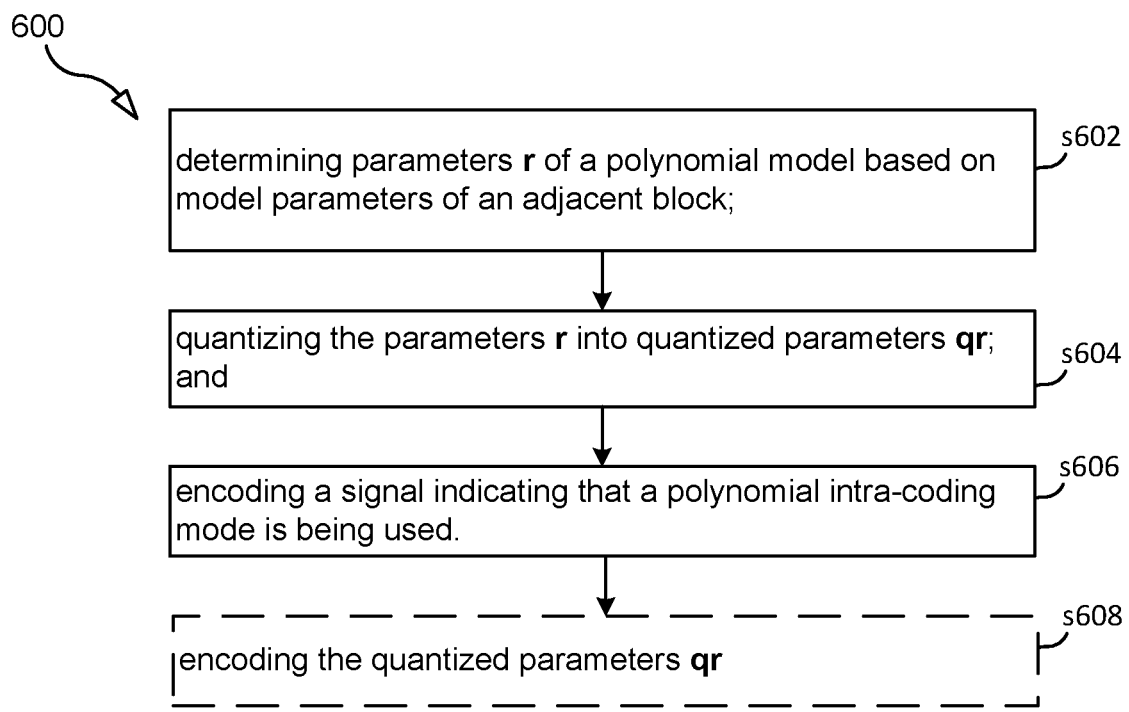
FIG. 6 is a flow chart according to an embodiment.

FIG. 6 illustrates a flow chart according to an embodiment. Process 600 is a method for encoding an image. The method may begin with step s602.

Step s602 comprises determining parameters r of a polynomial model based on model parameters of an adjacent block.

Step s604 comprises quantizing the parameters r into quantized parameters qr.

Step s606 comprises encoding a signal indicating that a polynomial intra-coding mode is being used.

Step s608, optionally, comprises encoding the quantized parameters qr.

Figure 7:
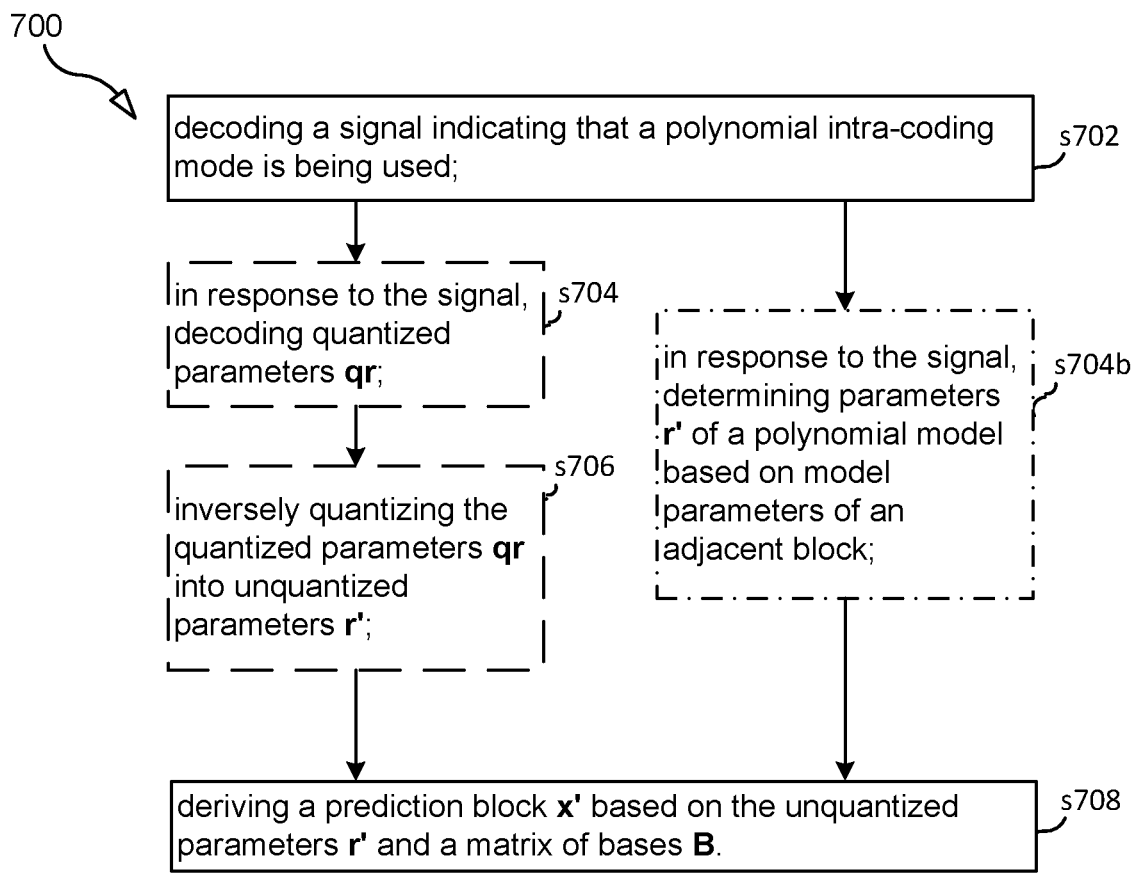
FIG. 7 is a flow chart according to an embodiment.

FIG. 7 illustrates a flow chart according to an embodiment. Process 700 is a method for decoding an image. The method may begin with step s702.

Step s702 comprises decoding a signal indicating that a polynomial intra-coding mode is being used.

Following step s702, either steps s704 and s706 may be performed or step s704b may be performed.

Step s704 comprises, in response to the signal, decoding quantized parameters qr; and step s706 comprises inversely quantizing the quantized parameters qr into unquantized parameters r'.

Step s704b comprises in response to the signal, determining parameters r' of a polynomial model based on model parameters of an adjacent block.

Following either step s706 or step s704b, step s708 may be performed.

Step s708 comprises deriving a prediction block x' based on the unquantized parameters r' and a matrix of bases B.

Figure 8:
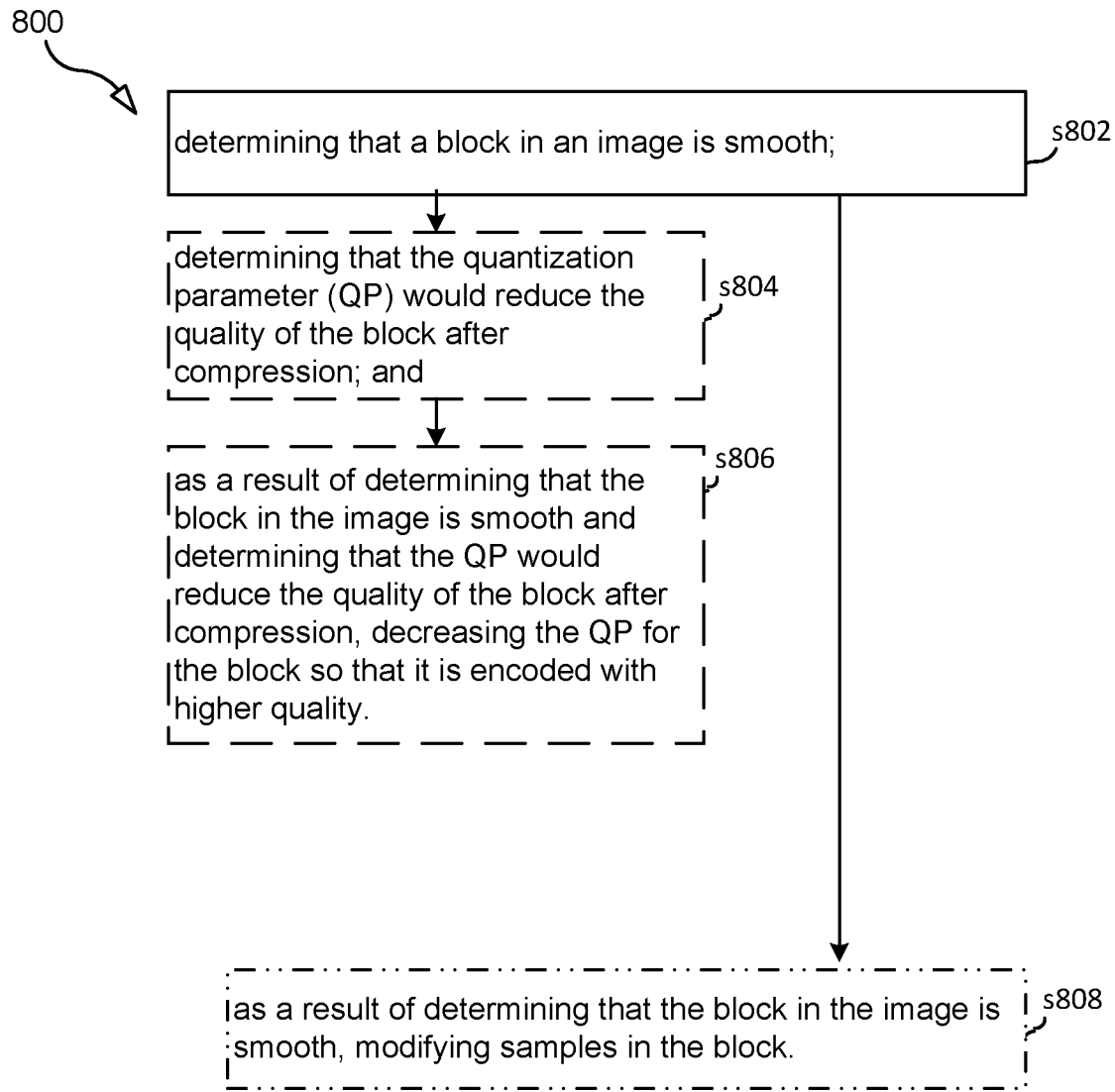
FIG. 8 is a flow chart according to an embodiment.

FIG. 8 illustrates a flow chart according to an embodiment. Process 800 is a method for adjusting a quantized parameter and/or a method for deblocking. The method may begin with step s802 and proceed to either steps s804 and s806 or to step s808.

Step s802 comprises determining that a block in an image is smooth.

Step s804 comprises determining that the quantized parameter (QP) would reduce the quality of the block after compression.

Step s806 comprises, as a result of determining that the block in the image is smooth and determining that the QP would reduce the quality of the block after compression, decreasing the QP for the block so that it is encoded with higher quality.

Step s808 comprises, as a result of determining that the block in the image is smooth, modifying samples in the block.

In some embodiments, determining that a block in an image is smooth comprises: determining parameters for a model based on low-frequency base functions; predicting predicted samples with the determined parameters; comparing the predicted samples with source samples of the block to determine an error; and determining that the error is below a threshold. In some embodiments, the low-frequency base functions comprise polynomial functions, and wherein comparing the predicted block with source samples to determine an error comprises computing one or more of a sum-of-absolute-differences (SAD) value and a sum-of-squared-differences (SSD) value for the differences between the source samples of the block and the predicted samples.

In some embodiments, decreasing the QP for the block so that it is encoded with higher quality comprises determining the decrease of the QP based on a linear model such that the decrease is larger for higher QPs and that there is no decrease of the QP below a specified value. In some embodiments, the decrease of the QP is determined by min(0, QPscale*QP+QPoffset), where QPscale and QPoffset are parameters. In some embodiments, the decrease of the QP is limited by a limiting value. In some embodiments, the decrease of the QP is determined by max(QPlimit, min(0, QPscale*QP+QPoffset)), where QPscale, QPoffset and QPlimit are parameters.

In some embodiments, the method further includes determining that the image is an intra-coded picture type, and wherein decreasing the quantized parameter (QP) for the block so that it is encoded with higher quality is performed as a result of determining that the image is an intra-coded picture type. In some embodiments, the method further includes determining that the image has a sequence number (e.g. picture order count (POC)) within a sequence of images that is a multiple of a value M, and wherein decreasing the quantized parameter (QP) for the block so that it is encoded with higher quality is performed as a result of determining that the image has a sequence number that is a multiple of M (e.g., 2, 4, 8, 16, 32).

In some embodiments, determining that a block in an image is smooth is based on information at a sub-block level of granularity. For example, if the block size (for example CTU size or CTU width/2 and CTU height/2) is 256×256 the smoothness could be determined on 64×64 or 128×128 sub-blocks of the 256×256 block. If the block size (for example CTU size or CTU width/2 and CTU height/2) is 128×128 the smoothness could be determined on 64×64 sub-blocks of the 128×128 block. If the block size is 64×64 (for example CTU size) the smoothness could be determined on 32×32 sub-blocks of the 64×64 block.

In some embodiments, modifying samples in the block is based on a polynomial model.

Here is one example of QP control implemented on top of the reference coder for VVC (VTM-12.0).

```
int EncModeCtrl::calculateLumaDQPsmooth(const CPelBuf& rcOrg)
{
    double avg = 0;
    double diff = 0;
    double thr = (double)m_pcEncCfg->getSmoothQPReductionThreshold( )*
rcOrg.height*rcOrg.width;
    int QPchange = 0;
  if (rcOrg.height >= 64 && rcOrg.width >= 64){
    const int numBasis = 6;
    double invb[numBasis][numBasis] = { {0.001*0.244140625000000, 0, 0, 0, 0, 0},
{0, 0.001*0.013204564833946, 0.001*0.002080251479290, -0.001*0.000066039729501, -
0.001*0.000165220364313, 0.000000000000000},
{0, 0.001*0.002080251479290, 0.001*0.013204564833946, -0.001*0.000066039729501,
0.000000000000000, -0.001*0.000165220364313},
{0, -0.001*0.000066039729501, -0.001*0.000066039729501, 0.001*0.000002096499349,
0.000000000000000, 0.000000000000000},
{0, -0.001*0.000165220364313, 0.000000000000000, 0.000000000000000,
0.001*0.000002622545465, 0.000000000000000},
{0, 0.000000000000000, -0.001*0.000165220364313, 0.000000000000000,
0.000000000000000, 0.001*0.000002622545465} };
    double boffset[5] = { -31.5, -31.5, -992.25, -1333.5, -1333.5 };
    int listQuadrantsX[4] = { 0, 64, 0, 64 };
    int listQuadrantsY[4] = { 0, 0, 64, 64 };
    double b1sum;
    double b2sum;
    double b3sum;
    double b4sum;
    double b5sum;
    double bosum;
    int numQuadrants = (rcOrg.height == 128 && rcOrg.width == 128) ? 2 : 1;
    //loop over quadrants
    for (int posy = 0; posy < numQuadrants; posy++)
    {
```

```
      for (int posx = 0; posx < numQuadrants; posx++)
      {
        b2sum = 0.0;
        b3sum = 0.0;
        b4sum = 0.0;
        b5sum = 0.0;
        b6sum = 0.0;
        avg = 0.0;
        for (uint32_t y = 0; y < 64; y++)
        {
          for (uint32_t x = 0; x < 64; x++)
          {
            const Pel& v = rcOrg.at(x + listQuadrantsX[posx + 2 * posy], y + listQuadrantsY[posx + 2 * posy]);
            b2sum += ((double)v)*((double)x + boffset[0]);
            b3sum += ((double)v)*((double)y + boffset[1]);
            b4sum += ((double)v)*((double)x*(double)y + boffset[2]);
            b5sum += ((double)v)*((double)x*(double)x + boffset[3]);
            b6sum += ((double)v)*((double)y*(double)y + boffset[4]);
            avg += (double)v;
          }
        }
        b1sum = avg;
        double r[numBasis];
        for (uint32_t b = 0; b < numBasis; b++)
        {
          r[b] = invb[b][0] * b1sum + invb[b][1] * b2sum + invb[b][2] * b3sum + invb[b][3] * b4sum + invb[b][4] * b5sum + invb[b][5] * b6sum;
        }
        // compute SAD for model
        for (uint32_t y = 0; y < 64; y++)
        {
          for (uint32_t x = 0; x < 64; x++)
          {
            const Pel& v = rcOrg.at(x + listQuadrantsX[posx + 2 * posy], y + listQuadrantsY[posx + 2 * posy]);
            diff += abs((int)v - (int)(r[0] + r[1] * ((double)x + boffset[0]) + r[2] * ((double)y + boffset[1]) + r[3] * ((double)x*(double)y + boffset[2]) + r[4] * ((double)x*(double)x + boffset[3]) + r[5] * ((double)y*(double)y + boffset[4])));
          }
        }
      }
    }
    if (diff < thr)
    {
      QPchange = max(m_pcEncCfg->getSmoothQPReductionLimit( ),min(0, (int)(m_pcEncCfg->getSmoothQPReductionModelScale( )*(double)baseQP + m_pcEncCfg->getSmoothQPReductionModelOffset( ))));;
    }
  }
  return changeQP;
}
```

Example parameters are m_pcEncCfg→getSmoothQPReductionLimit( )=−16, m_pcEncCfg→getSmoothQPReductionModelScale( )=−1.0, m_pcEncCfg→getSmoothQPReductionModelOffset( )=27. Where baseQP is the QP determined for the picture or block by other means, it could be from adaptive QP or just be a fixed QP for the picture. Then the baseQP is modified by the QPchange. The decrease of the QP can be performed on CTU size (128×128) or on size 64×64 in this example.

Figure 9:
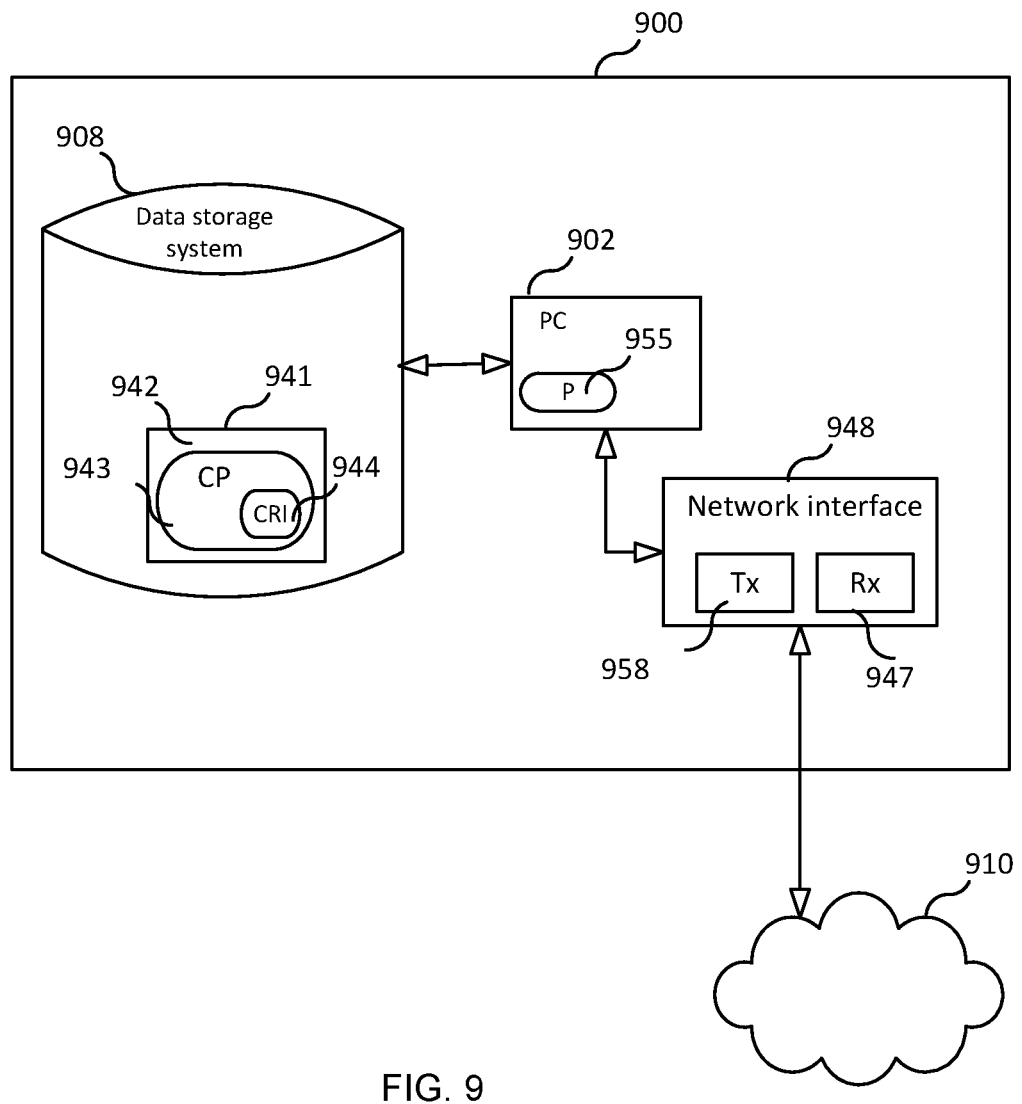
FIG. 9 is a block diagram of an encoder according to an embodiment.

FIG. 9 is a block diagram of node 900 (e.g., an encoder or decoder), according to some embodiments. As shown in FIG. 9, node 900 may comprise: processing circuitry (PC) 902, which may include one or more processors (P) 955 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., node 900 may be a distributed computing apparatus); at least one network interface 948 (e.g., a physical interface or air interface) comprising a transmitter (Tx) 945 and a receiver (Rx) 947 for enabling node 900 to transmit data to and receive data from other nodes connected to a network 910 (e.g., an Internet Protocol (IP) network) to which network interface 948 is connected (physically or wirelessly) (e.g., network interface 948 may be coupled to an antenna arrangement comprising one or more antennas for enabling node 900 to wirelessly transmit/receive data); and a local storage unit (a.k.a., "data storage system") 908, which may include one or more non-volatile storage devices and/or one or more volatile storage devices. In embodiments where PC 902 includes a programmable processor, a computer program product (CPP) 941 may be provided. CPP 941 includes a computer readable medium (CRM) 942 storing a computer program (CP) 943 comprising computer readable instructions (CRI) 944. CRM 942 may be a non-transitory computer readable medium, such as, magnetic media (e.g., a hard disk), optical media, memory devices (e.g., random access memory, flash memory), and the like. In some embodiments, the CRI 944 of computer program 943 is configured such that when executed by PC 902, the CRI causes node 900 to perform steps described herein (e.g., steps described herein with reference to the flow charts). In other embodiments, node 900 may be configured to perform steps described herein without the need for code. That is, for example, PC 902 may consist merely of one or more ASICs. Hence, the features of the embodiments described herein may be implemented in hardware and/or software.

As used herein, a network element, node, or subsystem (e.g., an encoder or decoder) may be comprised of one or more pieces of service network equipment, including hardware and software that communicatively interconnects other equipment on a network (e.g., other network elements, end stations, etc.), and is adapted to host one or more applications or services, either in a virtualized/non-virtualized environment, with respect to a plurality of subscribers and associated user equipment (UE) nodes that are operative to receive/consume content in a media distribution network where media content assets may be distributed and delivered using stream-based or file-based mechanisms. As such, some network elements may be disposed in a wireless radio network environment whereas other network elements may be disposed in a public packet-switched network infrastructure, including or otherwise involving suitable content delivery network (CDN) infrastructure that may comprise public, private, or mixed CDNs. Further, suitable network elements including one or more embodiments set forth herein may involve terrestrial and/or satellite broadband delivery infrastructures, e.g., a Digital Subscriber Line (DSL) network architecture, a Data Over Cable Service Interface Specification (DOCSIS)-compliant Cable Modem Termination System (CMTS) architecture, switched digital video (SDV) network architecture, a Hybrid Fiber-Coaxial (HFC) network architecture, a suitable satellite access network architecture or a broadband wireless access network architecture over cellular and/or WiFi connectivity. Accordingly, some network elements may comprise "multiple services network elements" that provide support for multiple network-based functions (e.g., 360° immersive A/V media preparation delivery policy management, session control, QoS policy enforcement, bandwidth scheduling management, content provider priority policy management, streaming policy management, and the like), in addition to providing support for multiple application services (e.g., data and multimedia applications including 360° immersive video assets (also referred to as 360-degree video assets or simply 360 video assets) in varying qualities or definitions). Example subscriber end stations or client devices may comprise various devices, tethered or untethered, that may consume or deliver media content assets using streaming and/or file-based downloading technologies, which may involve some type of rate adaptation in certain embodiments. Illustrative client devices or UE devices may therefore include any device configured to execute, inter alia, one or more client applications for receiving, recording, storing, and/or decoding/rendering 360 video content, live media and/or static/on-demand media, which may comprise Virtual Reality (VR) media, Augmented Reality (AR) media, Mixed Reality (MR) media, from one or more content providers, e.g., via a broadband access network, using HTTP, HTTPS, RTP, and the like. Accordingly, such client devices may include Next Generation IP-based STBs, networked TVs, personal/digital video recorders (PVR/DVRs), networked media projectors, portable laptops, netbooks, palm tops, tablets, smartphones, multimedia/video phones, mobile/wireless user equipment, portable media players, portable gaming systems or consoles (such as the Wii®, Play Station 3®, etc.) operating in concert with 3D display devices and the like, which may access or consume 360-degree content/services provided via a suitable media distribution network wherein a bandwidth and Quality of Experience (QoE) scheme may be provided in accordance with to one or more embodiments set forth herein.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

Skilled artisans will recognize that the foregoing generalized example network environment may be implemented in a hierarchical network architecture, with various aspects of media capture and preparation, including, e.g., source stream stitching, projection mapping, source media compression, tiled/ABR encoding/transcoding, packaging, etc., as well as distributing/uploading and edge node processes taking place in different network portions disposed at different hierarchical levels, involving one or more operators, content delivery networks (CDNs), edge networks, and the like. Further, in some implementations, at least some of the foregoing apparatuses and processes may be cloud-based. In some arrangements, a CDN can be a large distributed system of servers deployed in multiple data centers connected to the Internet or other public/private communications network. A CDN can be a managed or unmanaged network, and can also be a federation of managed or unmanaged networks.

An example embodiment of a media server/source system operatively associated within the foregoing example network environment may therefore be configured, e.g., as a global headend, to accept media content from live sources and/or static file sources, e.g., online content providers such as Hulu®, Netflix®, YouTube®, or Amazon® Prime, as well as VOD catalog or content providers or studios such as, e.g., Disney, Warner, Sony, etc. Media content from live sources may comprise live programming captured relative to any type of event, e.g., sporting/entertainment/gaming events, concerts, live TV shows, live news broadcasting sources, such as, for instance, national broadcasters (e.g., NBC, ABC, etc.) as well as cable broadcaster channels like Time Warner channels of CNN, ESPN, CNBC, etc., and local broadcasters, etc., including any secondary media insertions such as advertisement media channels.

In addition to the foregoing disclosure, the following is also noted.

Large transforms are excellent in reducing spatial redundancy. However, when source samples are very smooth the subjective quality can drop down very quickly in such areas with too coarse quantization. It is therefore suggested to reduce the QP according to a linear model for very smooth regions to prolong the breakdown of the subjective quality. Since smooth regions are relatively easy to code, the overhead in bitrate can be manageable. The impact on BDR for HDR CTC is as follows:

VTM-12.0 HDR CTC (luma/Cb/Cr): 0.07%/0.02%/0.16%

HM-16.22 (TF on) HDR CTC (luma/Cb/Cr): 0.70%/−0.18%/−0.05%

It is suggested to update VTM and HM with this functionality to improve subjective quality.

It has been observed that HM and VTM can drop in quality at relatively low QP in very smooth regions due to imprecise coding of transform coefficients. This contribution aims to circumvent that by reducing the QP for smooth blocks.

Smooth blocks are detected by fitting luma source samples to a low order polynomial model in regions of (for example) 64×64 samples. Then the distortion from a prediction according to the model is computed (SAD) and compared with a threshold. When the distortion is below the threshold the luma QP is reduced according to a linear model. The granularity of the QP adjustment is (for example) 64×64.

Configurable parameters are added to enable control of amount of strength of the QP reduction and also controlling which frames it is applied for (every, every second, every fourth, etc).

The method is implemented both on top of HM-16.22 [1] and VTM-12.0 [2] and tested for HDR CTC [3]:

VTM-12.0 for CTC HDR RA (QP change for all frames):

| | PSNR | | | | |
|---|---|---|---|---|---|
| | Y | U | V | EncT | DecT |
| Class H1 | 0.10% | 0.02% | 0.27% | 89% | 95% |
| Class H2 | 0.01% | 0.03% | −0.04% | 90% | 103% |
| Overall | 0.07% | 0.02% | 0.16% | 90% | 98% |

HM-16.22 (TF on) for CTC HDR RA (QP change for all frames):

| | PSNR | | | | |
|---|---|---|---|---|---|
| | Y | U | V | EncT | DecT |
| Class H1 | 1.02% | −0.21% | 0.13% | 96% | 95% |
| Class H2 | 0.12% | −0.14% | −0.38% | 99% | 96% |
| Overall | 0.70% | −0.18% | −0.05% | 97% | 95% |

REFERENCES

[1] HM-16.22, available at https://vcgit.hhi.fraunhofer.de/jvet/HM/-/releases/HM-16.22

[2] VTM-12.0, available at https://vcgit.hhi.fraunhofer.de/jvetNVCSoftware VTM/tagsNTM-12.0

[3] A. Segall, E. Francois, W. Husak, S. Iwamura and D. Rusanovskyy, "JVET common test conditions and evaluation procedures for HDR/WCG video", JVET-T2011, Meeting by Teleconference, October 2020.

SUMMARY OF VARIOUS EMBODIMENTS

A1. A method for making a smooth prediction block of samples in a picture in an image or video encoder or decoder, the method comprising:
determining parameters r of a polynomial model by $r=(B^TB)^{-1}*(B^T*x)$, where B is a matrix of bases and x is a source of samples in vector form; and
predicting a block x' based on the parameters r and the matrix of bases B.

A2. The method of embodiment A1, wherein the smooth prediction block x' comprises $x'=\Sigma_i[r(i)*b(i)]$, where r(i) refers to the i-th component of r and b(i) refers to the i-th basis vector of B, and the sum is taken over the number of basis vectors in B.

A3. The method of embodiment A1, wherein the smooth prediction block x' comprises $x'=(\Sigma_i[r(i)*b(i)]+2^{N-1})>>N$, where N is a scaling factor, r(i) refers to the i-th component of r and b(i) refers to the i-th basis vector of B, and the sum is taken over the number of basis vectors in B.

A4. The method of any one of embodiments A1-A3, wherein each basis vector b(i) in B has its mean removed such that b(i):=b(i)−mean (b(i)).

A5. The method of any one of embodiments A1-A4, wherein B at least includes three bases B={b1, b2, b3}, where $b1=\{1, 1, 1, \ldots, 1\}_T$, $b2=\{0, 1, \ldots M-1, \ldots, 0, 1, \ldots, M\}^T$, and $b3=\{0, \ldots, 0, 1, \ldots, 1, M-1, \ldots, M-1\}^T$, where M is equal to a height of the block.

A5'. The method of embodiment A5, wherein B further includes bases (b4, b5, b6) so that B={b1, b2, b3, b4, b5, b6}, where b4={0, . . . , 0, 1, 2, . . . M−1, . . . , M−1, 2*M−1, . . . , (M−1)*(M−1)}, b5={0, 1, 4, . . . , (M−1)*(M−1), 0, 1, 4, . . . , (M−1)*(M−1)} and b6={0, . . . , 0, 1, . . . , 1, 4, . . . , 4, . . . , (M−1)*(M−1)}.

A6. The method of any one of embodiments A1-A5 and A5', wherein $(B^TB)^{-1}$ is precomputed.

A7. The method of any one of embodiments A1-A6, wherein the source of samples x is determined by taking a subset of samples (e.g., every second sample horizontally and vertically).

A8. The method of any one of embodiments A1-A7, wherein each basis vector b(i) in B is taken at sample positions which are multiples of two.

A9. The method of any one of embodiments A1-A8, wherein a height of the block (M) is equal to the maximum transform size used in the image or video encoder/decoder.

B1. A method for encoding an image, the method comprising:
predicting samples in an image according to any one of the embodiments A1-A9; quantizing the parameters r into quantized parameters qr;
encoding a signal indicating that a polynomial intra-coding mode is being used; and encoding the quantized parameters qr.

B1'. A method for encoding an image, the method comprising:
determining parameters r of a polynomial model based on model parameters of an adjacent block;

quantizing the parameters r into quantized parameters qr; and encoding a signal indicating that a polynomial intra-coding mode is being used.

B1'a. The method of embodiment B1' further comprising encoding the quantized parameters qr.

B2. The method of any one of embodiments B1, B1', and B1'a, wherein the source of samples x comprise samples immediately above and/or to the left of the block x'.

B3. The method of any one of embodiments B1-B2, wherein encoding the quantized parameters qr comprises:

predicting parameters rPred based on samples immediately above and/or to the left of the block x';

determining a delta value for each component i of qr based on a difference between the quantized parameters qr(i) and the predicted parameters rPred(i); and encoding the delta value.

C1. A method for decoding an image, the method comprising:

decoding a signal indicating that a polynomial intra-coding mode is being used;

in response to the signal, decoding quantized parameters qr;

inversely quantizing the quantized parameters qr into unquantized parameters r';

deriving a prediction block x' based on the unquantized parameters r' and a matrix of bases B.

C1'. A method for decoding an image, the method comprising:

decoding a signal indicating that a polynomial intra-coding mode is being used;

in response to the signal, determining parameters r' of a polynomial model based on model parameters of an adjacent block;

deriving a prediction block x' based on the unquantized parameters r' and a matrix of bases B.

D1. A method for adjusting a quantized parameter, the method comprising:

determining that a block in an image is smooth;

determining that the quantized parameter (QP) would reduce the quality of the block after compression; and as a result of determining that the block in the image is smooth and determining that the QP would reduce the quality of the block after compression, decreasing the QP for the block so that it is encoded with higher quality.

D2. The method of embodiment D1, wherein determining that a block in an image is smooth comprises:

determining parameters for a model based on low-frequency base functions;

predicting predicted samples with the determined parameters;

comparing the predicted samples with source samples of the block to determine an error; and determining that the error is below a threshold.

D3. The method of embodiment D2, wherein the low-frequency base functions comprise polynomial functions, and wherein comparing the predicted block with source samples to determine an error comprises computing one or more of a sum-of-absolute-differences (SAD) value and a sum-of-squared-differences (SSD) value for the differences between the source samples of the block and the predicted samples.

D4. The method of any one of embodiments D2-D3, wherein decreasing the QP for the block so that it is encoded with higher quality comprises determining the decrease of the QP based on a linear model such that the decrease is larger for higher QPs and that there is no decrease of the QP below a specified value.

D4'. The method of embodiment D4, wherein the decrease of the QP is determined by min(0,QPscale*QP+QPoffset), where QPscale and QPoffset are parameters.

D4''. The method of any one of embodiments D4 and D4', wherein the decrease of QP is limited by a limiting value.

D4'''. The method of embodiment D4, wherein the decrease of the QP is determined by max(QPlimit, min(0,QPscale*QP+QPoffset)), where QPscale, QPoffset and QPlimit are parameters.

D5. The method of any one of embodiments D1-D4, D4', D4'', and D4''', further comprising determining that the image is an intra-coded picture type, and wherein decreasing the quantized parameter (QP) for the block so that it is encoded with higher quality is performed as a result of determining that the image is an intra-coded picture type.

D6. The method of any one of embodiments D1-D4, D4', D4'', and D4''', further comprising determining that the image has a sequence number (e.g. picture order count (POC)) within a sequence of images that is a multiple of a value M, and wherein decreasing the quantized parameter (QP) for the block so that it is encoded with higher quality is performed as a result of determining that the image has a sequence number that is a multiple of M.

D7. The method of embodiment D6, wherein M is one of 2, 4, 8, 16, and 32.

D8. The method of any one of embodiments D1-D7, wherein determining that a block in an image is smooth is based on information at a sub-block level of granularity.

E1. A method for deblocking, the method comprising:

determining that a block in an image is smooth; and as a result of determining that the block in the image is smooth, modifying samples in the block.

E2. The method of embodiment E1, wherein determining that a block in an image is smooth comprises:

determining parameters for a model based on low-frequency base functions;

predicting predicted samples with the determined parameters;

comparing the predicted samples with source samples of the block to determine an error; and determining that the error is below a threshold.

E3. The method of embodiment E2, wherein the low-frequency base functions comprise polynomial functions, and wherein comparing the predicted block with source samples to determine an error comprises computing one or more of a sum-of-absolute-differences (SAD) value and a sum-of-squared-differences (SSD) value for the differences between the source samples of the block and the predicted samples.

E4. The method of any one of embodiments E2-E3, wherein modifying samples in the block is based on a polynomial model.

F1. A computer program comprising instructions which when executed by processing circuitry of a node, causes the node to perform the method of any one of embodiments A1-A9, B1-B3, C1, C1', D1-D7, and E1-E4.

F2. A carrier containing the computer program of embodiment F1, wherein the carrier is one of an electronic signal, an optical signal, a radio signal, and a computer readable storage medium.

G1. An encoder, the encoder comprising:
processing circuitry; and
a memory, the memory containing instructions executable by the processing circuitry, whereby the encoder is configured to perform the method of any one the embodiments A1-A9, B1-B3, D1-D7, and E1-E4.

G2. A decoder, the decoder comprising:
processing circuitry; and
a memory, the memory containing instructions executable by the processing circuitry, whereby the decoder is configured to perform the method of any one the embodiments A1-A9, C1, C1', and E1-E4.

H1. An encoder configured to make a smooth prediction block of samples in a picture, the encoder being further configured to:
determine parameters r of a polynomial model by $r=(B^T B)^{-1}*(B^{T}*x)$, where B is a matrix of bases and x is a source of samples in vector form; and
predict a block x' based on the parameters r and the matrix of bases B.

H2. The encoder of embodiment H1, wherein the encoder is further configured to perform the method of any one of embodiments A2-A9.

I1. An encoder configured to encode an image, the encoder being further configured to:
predict samples in an image according to any one of the embodiments A1-A9;
quantize the parameters r into quantized parameters qr;
encode a signal indicating that a polynomial intra-coding mode is being used; and
encode the quantized parameters qr.

I1'. An encoder configured to encode an image, the encoder being further configured to:
determine parameters r of a polynomial model based on model parameters of an adjacent block;
quantize the parameters r into quantized parameters qr; and
encode a signal indicating that a polynomial intra-coding mode is being used I2. The encoder of any one of embodiment I1 and I1', wherein the encoder is further configured to perform the method of any one of embodiments B2-B3.

J1. An encoder configured to adjust a quantized parameter, the encoder being further configured to:
determine that a block in an image is smooth;
determine that the quantized parameter (QP) would reduce the quality of the block after compression; and
as a result of determining that the block in the image is smooth and determining that the QP would reduce the quality of the block after compression, decrease the QP for the block so that it is encoded with higher quality.

J2. The encoder of embodiment J1, wherein the encoder is further configured to perform the method of any one of embodiments D2-D7.

K1. An encoder configured to deblock, the encoder being further configured to: determine that a block in an image is smooth; and as a result of determining that the block in the image is smooth, modify samples in the block.

K2. The encoder of embodiment K1, wherein the encoder is further configured to perform the method of any one of embodiments E2-E4.

L1. A decoder configured to make a smooth prediction block of samples in a picture, the decoder being further configured to:
determine parameters r of a polynomial model by $r=(B^T B)^{-1}*(B^{T}*x)$, where B is a matrix of bases and x is a source of samples in vector form; and
predict a block x' based on the parameters r and the matrix of bases B.

L2. The decoder of embodiment L1, wherein the decoder is further configured to perform the method of any one of embodiments A2-A9.

M1. A decoder configured to decode an image, the decoder being further configured to:
decode a signal indicating that a polynomial intra-coding mode is being used;
in response to the signal, decode quantized parameters qr;
inversely quantize the quantized parameters qr into unquantized parameters r';
derive a prediction block x' based on the unquantized parameters r' and a matrix of bases B.

M1'. A decoder configured to decode an image, the decoder being further configured to:
decode a signal indicating that a polynomial intra-coding mode is being used;
in response to the signal, determine parameters r' of a polynomial model based on model parameters of an adjacent block;
derive a prediction block x' based on the unquantized parameters r' and a matrix of bases B.

N1. A decoder configured to deblock, the decoder being further configured to:
determine that a block in an image is smooth; and
as a result of determining that the block in the image is smooth, modify samples in the block.

N2. The decoder of embodiment K1, wherein the decoder is further configured to perform the method of any one of embodiments E2-E4.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for adjusting a quantization parameter (QP) for a block in an image, the method comprising:
determining that the block in the image is smooth, wherein determining that the block in the image is smooth is based on information at a sub-block level of granularity;
determining that the OP for the block would reduce the quality of the block after compression;
determining that the image is an intra-coded picture type; and
as a result of determining that: i) the block in the image is smooth, ii) the QP would reduce the quality of the block after compression, and iii) the image is an intra-coded picture type, decreasing the QP for the block so that the block is encoded with higher quality.

2. The method of claim 1, wherein determining that a block in an image is smooth comprises:
   determining parameters for a model based on low-frequency base functions;
   predicting predicted samples with the determined parameters;
   comparing the predicted samples with source samples of the block to determine an error; and
   determining that the error is below a threshold.

3. The method of claim 2, wherein
   the low-frequency base functions comprise polynomial functions, and
   comparing the predicted block with source samples to determine an error comprises computing one or more of a sum-of-absolute-differences (SAD) value and a sum-of-squared-differences (SSD) value for the differences between the source samples of the block and the predicted samples.

4. The method of claim 2, wherein decreasing the QP for the block so that it is encoded with higher quality comprises determining the decrease of the QP based on a linear model such that the decrease is larger for higher QPs and that there is no decrease of the QP below a specified value.

5. The method of claim 4, wherein the decrease of the QP is determined by min (0,QPscale*QP+QPoffset), where QPscale is a first parameter and QPoffset is a second parameter.

6. The method of claim 4, wherein the decrease of QP is limited by a limiting value.

7. The method of claim 4, wherein the decrease of the QP is determined by max (QPlimit, min (0,QPscale*QP+QPoffset)), where QPscale is a first parameter, QPoffset is a second parameter, and QPlimit is a third parameter.

8. The method of claim 1, further comprising determining that the image has a sequence number within a sequence of images that is a multiple of a value M, wherein
   decreasing the quantized parameter (QP) for the block so that it is encoded with higher quality is performed as a result of determining that the image has a sequence number that is a multiple of M.

9. The method of claim 8, wherein M is 2, 4, 8, 16, or 32.

10. A non-transitory computer readable storage medium storing a computer program comprising instructions which when executed by processing circuitry of a node, causes the node to perform the method of claim 1.

11. An apparatus, the apparatus comprising:
    processing circuitry; and
    a memory, the memory containing instructions executable by the processing circuitry, wherein the apparatus is configured to perform a method for adjusting a quantization parameter (OP) for a block in an image, the method comprising:
    determining that the block in the image is smooth, wherein determining that the block in the image is smooth is based on information at a sub-block level of granularity;
    determining that the QP for the block would reduce the quality of the block after compression;
    determining that the image is an intra-coded picture type; and
    as a result of determining that: i) the block in the image is smooth, ii) the QP would reduce the quality of the block after compression, and iii) the image is an intra-coded picture type, decreasing the QP for the block so that the block is encoded with higher quality.

* * * * *